United States Patent [19]

Williams

[11] Patent Number: 4,627,187
[45] Date of Patent: Dec. 9, 1986

[54] FISH STUNNING ASSEMBLY

[76] Inventor: Theodore M. Williams, 1360 Keneki Pl., Hilo, Hi. 96720

[21] Appl. No.: 742,959

[22] Filed: Jun. 10, 1985

[51] Int. Cl.⁴ ...................... A01K 79/02; A01K 85/00
[52] U.S. Cl. .................................................. 43/17.1
[58] Field of Search ...................... 43/17.1, 4.5, 4, 5, 43/42

[56] References Cited

U.S. PATENT DOCUMENTS

| | | | |
|---|---|---|---|
| 1,838,981 | 12/1931 | Anderson | 43/17.1 |
| 3,083,491 | 4/1963 | Meysan | 43/17.1 |
| 3,324,589 | 6/1967 | Soichiro | 43/17.1 |
| 3,382,598 | 5/1968 | Wilson | 43/17.1 |
| 3,416,254 | 12/1968 | Bornzin | 43/17.1 |

*Primary Examiner*—Gene P. Crosby

[57] ABSTRACT

An electrical fish stunning assembly is disclosed having an elongated cylinder tapered at the ends and connected to a fishing line at one end, and an insulated leader wire and partially insulated hook extends from the other end of the assembly. A dry cell storage battery is arranged to supply electricity to a high voltage booster. A strong spring biases a movable contact to an open position against the pull of the leader wire, whereby closure of the contact points closes a circuit that allows a surge of the stored high voltage electricity to surge thru the leader and hook rendering the fish unconscious. This will enable fishermen all over the world to boat more fish and reduce chances of injury to the fisherman, while at the same time providing a better grade of fish flesh to the market place.

2 Claims, 2 Drawing Figures

FISH STUNNING ASSEMBLY

FIELD OF THE INVENTION

A fish stunning lure is provided having an electric high voltage booster inside so that when actuated by a fish pulling against the hook, the fish will be made immobile for landing, and a better grade of fish flesh is made available to the market place due to the lack of fish burn.

DESCRIPTION OF THE PRIOR ART

Various devices are known for electrically stunning aquatic creatures for retrieval: Anderson U.S. Pat. No. 1,838,981; Meysan U.S. Pat. No. 3,083,491, and Makino U.S. Pat. No. 3,324,589. The present device distinguishes over the above examples by providing an underwater lure having a high voltage electric fish stunning device in combination with a strong spring arranged to keep the high voltage circuit safe for the fisherman.

SUMMARY OF THE INVENTION

The primary objective of this invention is to provide an easier method of catching fish and to prevent fish burn which is caused when fish have to struggle against the resistance of a line while being caught. Fish burn renders many fish such as the larger Ahi (Tuna) from being marketable at the best price due to the discoloration of the fish flesh. The invention provides a much more positive and sure way of catching fish and to prevent the loss of fish that would ordinarily get away and break the fish line. Fish are caught in a more humane manner, by instantly shocking them into unconsciousness and enable the fish to be brought aboard with out all of the struggle on the fishes part.

Various objectives and advantages for wide use of this invention will become apparent from the following descriptions of the drawings, Illustrating herewith the presently preferred embodiment thereof and wherein.

DESCRIPTION OF THE PREFERRED EMBODIMENT

Figure 1:
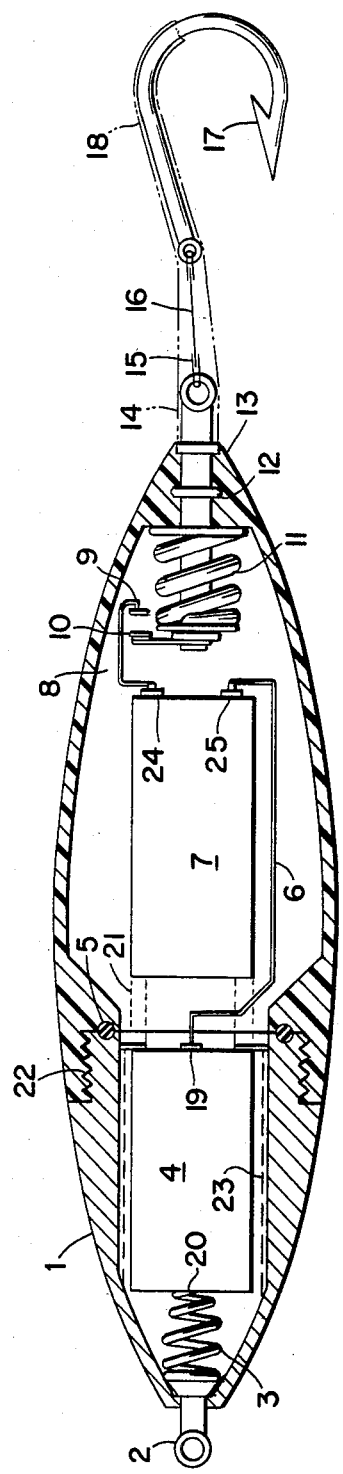
FIG. 1 is a side elevational view of the stun lure assembly.

FIG. 1 is a side elevational view of the stun lure assembly. The body of the stun lure outer casing is constructed in two parts, it is Item 1. The forward part attached to the fish line is made of metal for the best conductivity, while the after following part of the stun lure body with dotted lines in drawing hatching is made of plastic with a high dielectrical resistance Item 2 shows the leading eye for attaching a fish line. Item 3 indicates a spring that acts as as battery grounding point. Item 4 indicates a dry cell battery that provides electricity to the high voltage unit.

Item 5 is the neoprene ring seal between the forward and aft part of the stun lure. It furnishes a leakproof seal of the two member at that screwed junction. Item 6 is the electrical conductor from the positive side of the dry cell battery item 19 to the incomming low voltage post item 25 of the electrical high voltage booster item 7. High voltage booster assemblys are widely used in automobiles, cattle stun prods and the like. Item 8 is the high voltage connector to contact point 9. Item 9 is the contact point that supplies electrical energy to point 10 when the fish pulls against the resistance of the spring 11 drawing the contact point 10 down touching contact point 9 sending a electric high voltage shock thru the eye assembly shaft 14 down the insulated metal leader to the hook to the fishes head. Item 11 is the tensioned spring strong enough to prevent small fish from compressing it an triggering an electrical discharge of the stun lure and making it safe to handle in normal circumstances. Item 12 is the O ring that provides a water tight seal of the sliding eye shaft 14, in and out of the assembly item 1 aft body item 13. Item 13 is the aft end of the assembly Item 1. Item 14 is the metal shaft with an eye for connecting the leader on one end and a nut on the opposite end to connect to the fastener to the contact point Item 10, it slides in and out against the tension of the spring. This shaft sliding in and out in the plastic part of the stun lure assembly which has a high electrical insulating value permits electricity to flow freely thru it down the shaft to the leader and hook. Item 15 is the attachment part of the metal leader wire. Item 16 is the insulated metal leader wire carrying the electrical stun power down it to the hook. Item 17 is the hook which is to be partially insulated with the sharp point and barb uninsulated. Item 18 is the insulating coating that is applied to the metal parts of the leader and hook as needed to prevent loss of electrical shocking power to the tip of the hook. Item 19 is the positive post of the dry cell battery. Item 20 is the grounding point of the dry cell battery. Item 21 is the grounding point of the high voltage booster unit Item no 7. Item 22 is the threaded connection for the assembly of Item 1 forward section with hatched lines and the aft section with light and heavy hatched lines.

Item 23 is the insulation around the battery. In some cases it may be preferable to use a plurality of batterys. Item 24 is the positive high voltage discharge from the inside the electrical stun unit item 7. Item 25 is the entering low voltage from the battery item 4 to high voltage stun booster unit item no 7.

Figure 2:
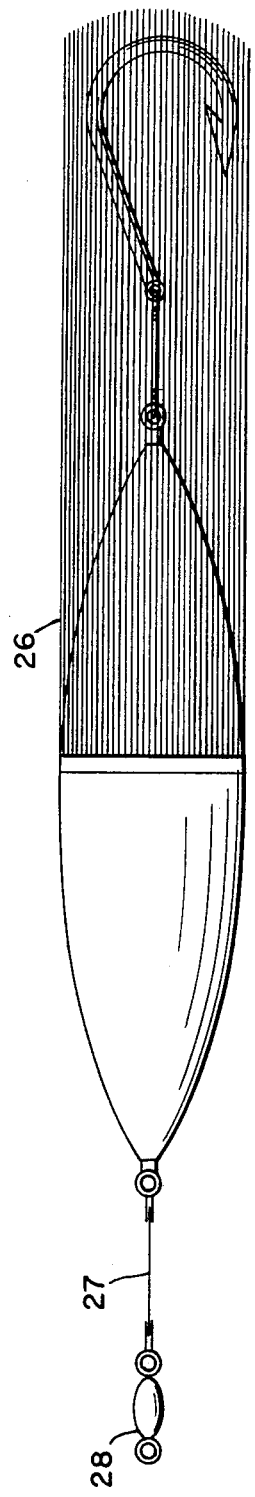
FIG. 2 is a smaller view showing the optional skirt.

FIG. 2, item 26 is a fishing lure skirt fastened on to stun lure assembly item No. 1. Item 27 is a connecting fish line. Item 28 is a fish line swivel.

At present there is a demanding need for some means of catching and boating larger fish without raising their body temperature causing fish burn which reduces the market value of the fish due to flesh deterioration. This is particularly true in Hawaiian waters where large ahi (tuna) are caught. The high voltage electrical stun lure or drift fishing device will prevent the fish burn problem as the fish will be shocked into unconsciousness with the first firm tug on the fish line, enabling the fisherman to boat the fish with out all of the tiring the fish out before boating. At certain times of the year the demand for prime tuna or ahi runs from $15.00 to $20.00-per pound. It is entirely possible that the fish caught in the more humane shock treatment method will bring a substantial increased price.

Almost every fisherman who seriously fishes can tell a story of trying to boat a fish after trying for a long time only to see it break the line and slip away at the last moment.

The electrical stun type fishing assembly makes fishing safer for the fisherman. Many a fisherman has been bitten, knocked out of his boat, or had bones broken by a large fighting fish as it was boarded. The stun lure assembly makes fishing much safer.

Various modifications and changes are contemplated and may be resorted to, without departing from the function and scope of the invention, as herein and after defined by the appended claim.

I claim as my invention:

1. A high voltage underwater fish stunning assembly, comprising an elongated cylinder tapered at the ends and connected to a fishing line at one end, an insulated leader wire and partially insulated hook extending from the other end of the assembly, an electric high voltage booster inside the cylinder, a dry cell storage battery arranged to supply electricity to said electrical high voltage booster, a movable shaft with a connecting eye at one end secured to said leader wire, a pair of contact points, one of said contact points being movable and supported by the other end of said shaft, the other contact point of said pair being connected to said high voltage booster, a spring on said shaft biasing the movable contact to an open position against the pull of the leader wire, whereby closure of the contact points closes a circuit that allows a surge of the stored high voltage electricity to surge thru the shaft leader wire and hook rendering the fish unconscious.

2. A high voltage underwater fish stunning assembly as in claim 1, wherein said spring has a high resistance and is partially pretensioned, wherein the assembly is able to provide high voltage electric shock to the fish underwater while being safe to use due to the high resistance of the pretensioned spring inside the assembly which keeps the high voltage circuit inactive unless the fish is pulling strongly against the hook and leader.

* * * * *